US012116924B1

United States Patent
Haney et al.

(10) Patent No.: US 12,116,924 B1
(45) Date of Patent: Oct. 15, 2024

(54) SYSTEM AND METHOD FOR CONTROLLING INTERNAL COMBUSTION ENGINE TURBOCHARGER SHAFT SPEED

(71) Applicant: GM Global Technology Operations LLC, Detroit, MI (US)

(72) Inventors: Wesley Rieves Haney, Linden, MI (US); David Alexander Schmitt, Waterford, MI (US); John Garrity Singleton, Detroit, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 15 days.

(21) Appl. No.: 18/186,460

(22) Filed: Mar. 20, 2023

(51) Int. Cl.
*F02B 37/12* (2006.01)

(52) U.S. Cl.
CPC ........ *F02B 37/12* (2013.01); *F02B 2037/122* (2013.01)

(58) Field of Classification Search
CPC ............................. F02B 37/12; F02B 2037/122
See application file for complete search history.

(56) References Cited

U.S. PATENT DOCUMENTS

| | | | | |
|---|---|---|---|---|
| 2014/0127004 A1* | 5/2014 | Schaeflein | ............ | F02B 37/186 60/605.1 |
| 2017/0002728 A1* | 1/2017 | Saeki | ................. | F02D 41/0007 |
| 2017/0016389 A1* | 1/2017 | Xiao | ........................ | F02B 37/16 |
| 2022/0170413 A1* | 6/2022 | Dixon | ................. | F02D 41/0007 |
| 2023/0038827 A1* | 2/2023 | Baramov | ............ | F02D 41/1441 |

FOREIGN PATENT DOCUMENTS

| | | |
|---|---|---|
| EP | 2434122 A1 | 3/2012 |
| WO | WO-2022202426 A1 * | 9/2022 |

OTHER PUBLICATIONS

Machine translation of WO-2022202426-A1, accessed Jun. 12, 2024. (Year: 2024).*

* cited by examiner

*Primary Examiner* — Jonathan R Matthias
(74) *Attorney, Agent, or Firm* — Vivacqua Crane, PLLC (57) ABSTRACT

A system for controlling turbocharger shaft speed for an internal combustion engine (ICE) includes sensors and actuators and control modules in communication with the sensors and actuators. The control modules store and execute control logic that generates a predicted shaft speed from turbocharger shaft speed data. A shaft speed control algorithm (SSCA) is selectively initialized. The SSCA generates lower and upper limits to turbocharger flow corrections applied via the actuators. Closed loop control outputs are applied selectively to the actuators to control a mass flow through a compressor of the turbocharger. The SSCA selectively determines the shaft speed has exceeded a threshold, and the actuators alter a pressure ratio of the ICE. The SSCA operates the turbocharger stably within predefined hardware limits at an optimum shaft speed while maintaining constant flow across a range of pressure ratios. A long-term memory learning process trims turbocharger performance.

15 Claims, 5 Drawing Sheets

SYSTEM AND METHOD FOR CONTROLLING INTERNAL COMBUSTION ENGINE TURBOCHARGER SHAFT SPEED

INTRODUCTION

The present disclosure relates to internal combustion engines (ICEs), and more specifically to ICEs equipped with one or more forced induction devices such as turbochargers. ICEs are frequently equipped with forced induction devices to increase ICE power density while reducing mass, overall ICE displacement, and increasing efficiency. Turbocharged ICEs often utilize manual and/or electronic boost control systems and methods to maintain and achieve various performance metrics. In order to maximize power output for a given turbocharged ICE, the engine control unit (ECU) and boost control systems and methods may operate the one or more turbochargers of a turbocharged ICE at or very near physical limits of the turbocharger which can result in thermal inefficiencies, performance degradation, premature component failure, or the like.

Accordingly, while current forced induction systems and associated methods for managing turbocharger boost operate for their intended purpose, there is a need for a new and improved system and method for controlling ICE turbocharger shaft speed that improves redundancy, improves ICE performance and turbocharger performance, and quickly and accurately limits turbocharger output within predefined margins while using preexisting componentry and reducing complexity.

SUMMARY

In an aspect of the present disclosure a system for controlling turbocharger shaft speed for an internal combustion engine (ICE) includes a boost control system having one or more sensors and one or more actuators. The one or more sensors detecting at least a turbocharger shaft speed, and a mass flow through the ICE, and the one or more actuators selectively adjusting mass flow through the ICE and the turbocharger. The system further includes one or more control modules. Each of the one or more control modules has a processor, a memory, and one or more input/output (I/O) ports. The one or more control modules are in communication with the one or more sensors and in communication with the one or more actuators via the I/O ports. The memory stores programmatic control logic. The processor executes the programmatic control logic. The programmatic control logic includes at least first, second, third, fourth, fifth, and sixth control logics. The first control logic generates a predicted turbocharger shaft speed from data acquired by a turbocharger shaft speed (TSS) sensor of the one or more sensors. The second control logic selectively initializes a turbocharger shaft speed control algorithm (SSCA). The third control logic, within the SSCA, generates a lower limit and an upper limit, greater than the lower limit, to a quantity of turbocharger flow correction to be applied via the one or more actuators. The fourth control logic, within the SSCA, applies a closed loop control output to the one or more actuators to control a mass flow through a compressor of the turbocharger. The fifth control logic, within the SSCA, selectively determines that the turbocharger shaft speed has exceeded a predefined threshold, and utilizes the one or more actuators to directly alter a pressure ratio of the ICE. The sixth control logic, within the SSCA, utilizes a long-term memory learning process that utilizes data from the one or more sensors and the one or more actuators as inputs to trim turbocharger performance. The SSCA causes the turbocharger to operate stably within predefined hardware limits at an optimum shaft speed while maintaining constant flow across a range of pressure ratios.

In another aspect of the present disclosure the first control logic further includes control logic for generating a predicted turbocharger shaft speed from a sum of a measured turbocharger shaft speed, and a rate of change of the turbocharger shaft speed over a predefined prediction horizon. The measured turbocharger shaft speed is determined by one or more of: a direct measurement from the TSS sensor and a modeled turbocharger shaft rotational speed.

In another aspect of the present disclosure the second control logic further includes control logic that, upon determining that the turbocharger shaft speed is greater than or equal to an initialization threshold, initializes the SSCA. Upon determining that the turbocharger shaft speed is less than the initialization threshold, the control logic re-obtains the measured turbocharger shaft speed and rate of change of the turbocharger shaft speed over the predefined prediction horizon. Upon determining that the turbocharger shaft speed has fallen below the initialization threshold, the control logic exits the SSCA and re-obtains the measured turbocharger shaft speed and rate of change of the turbocharger shaft speed over the predefined prediction horizon.

In another aspect of the present disclosure the third control logic further includes a control logic for calibrating the upper limit to a maximum possible turbocharger flow based on physical characteristics of the turbocharger, and a control logic for calibrating the lower limit to a target turbocharger flow correction for closed loop control while the SSCA is running. The upper limit and the lower limit are enforced upon the turbocharger through use of actuators including a throttle body of the ICE and a wastegate of the turbocharger.

In another aspect of the present disclosure the initialization threshold further includes a lookup table that multiplies actual ICE mass flow by a factor based on a filtered rate of change of the turbocharger shaft speed at a time at which the SSCA is initialized.

In another aspect of the present disclosure the fourth control logic further includes a control logic for applying closed loop calculations to a calibrated turbocharger target shaft speed, for outputting a desired mass flow through the compressor of the turbocharger, and for converting the desired mass flow into a cylinder airmass for the boost control system of the ICE.

In another aspect of the present disclosure the fourth control logic further includes control logic that applies a throttle pressure ratio request based on the predicted turbocharger shaft speed and current rate of change of the turbocharger shaft speed, and control logic that maintains constant turbocharger shaft speed and constant flow below the upper limit, and above the lower limit.

In another aspect of the present disclosure the sixth control logic further includes control logic for selectively applying a slow learn limit, a fast learn limit, a up learn limit, and a null factor to adjustments to the turbocharger shaft speed. The slow learn limit is applied when the turbocharger shaft speed is within a first predefined threshold greater than the calibrated turbocharger target shaft speed, the fast learn limit is applied when the turbocharger shaft speed is within a second predefined threshold greater than the first predefined threshold and greater than the calibrated turbocharger target shaft speed, the up learn limit is applied when the turbocharger shaft speed is within a third predefined threshold less than the calibrated turbocharger target shaft speed, and the null factor is applied when the turbocharger shaft speed is substantially equal to the calibrated turbocharger target shaft speed. The slow learn limit, fast learn limit, up learn limit, and null factor are continuously applied to adjustments to the turbocharger shaft speed while the SSCA is running.

In another aspect of the present disclosure the first predefined threshold is 500 revolutions per minute (RPM) above the calibrated target speed, the second predefined threshold is 1000 RPM greater than the calibrated target speed, and the up learn limit is 500 RPM less than the calibrated target speed.

In another aspect of the present disclosure the SSCA modifies the predicted turbocharger shaft speed by applying a multiplicative factor that accounts for ICE and turbocharger aging.

In another aspect of the present disclosure a method for controlling turbocharger shaft speed for an internal combustion engine (ICE) includes detecting at least a turbocharger shaft speed and a mass flow through the ICE with one or more sensors disposed on the ICE and on the turbocharger. The method further includes selectively adjusting a mass flow through the ICE and the turbocharger with one or more actuators. The one or more actuators and the one or more sensors define components of a boost control system. The method further includes utilizing one or more control modules. Each of the one or more control modules has a processor, a memory, and one or more input/output (I/O) ports. The one or more control modules are in communication with the one or more sensors and in communication with the one or more actuators via the I/O ports. The memory stores programmatic control logic. The processor executes the programmatic control logic. The programmatic control logic includes control logic for: generating a predicted turbocharger shaft speed from data acquired by a turbocharger shaft speed (TSS) sensor of the one or more sensors and selectively initializing a turbocharger shaft speed control algorithm (SSCA). The method generates a lower limit and an upper limit, greater than the lower limit, to a quantity of turbocharger flow correction to be applied via the one or more actuators. The method applies a closed loop control output to the one or more actuators to control a mass flow through a compressor of the turbocharger. The method selectively determines that the turbocharger shaft speed has exceeded a predefined threshold, and utilizes the one or more actuators to directly alter a pressure ratio of the ICE. The method utilizes a long-term memory learning process to trim turbocharger performance that uses data from the one or more sensors and the one or more actuators as inputs to trim turbocharger performance. The method causes the turbocharger to operate stably within predefined hardware limits at an optimum shaft speed while maintaining constant flow across a range of pressure ratios.

In another aspect of the present disclosure the method further includes generating a predicted turbocharger shaft speed from a sum of a measured turbocharger shaft speed and a rate of change of the turbocharger shaft speed over a predefined prediction horizon. The measured turbocharger shaft speed is determined by one or more of: a direct measurement from the TSS sensor and a modeled turbocharger shaft rotational speed.

In another aspect of the present disclosure the method initializes the SSCA upon determining that the turbocharger shaft speed is greater than or equal to an initialization threshold, and re-obtains the measured turbocharger shaft speed and rate of change of the turbocharger shaft speed over the predefined prediction horizon upon determining that the turbocharger shaft speed is less than the initialization threshold. The method exits the SSCA and re-obtains the measured turbocharger shaft speed and rate of change of the turbocharger shaft speed over the predefined prediction horizon upon determining that the turbocharger shaft speed has fallen below the initialization threshold.

In another aspect of the present disclosure the method calibrates the upper limit to a maximum possible turbocharger flow based on physical characteristics of the turbocharger, and calibrates the lower limit to a target turbocharger flow correction for closed loop control while the SSCA is running. The method enforces the upper limit and the lower limit upon the turbocharger through use of actuators including a throttle body of the ICE and a wastegate of the turbocharger.

In another aspect of the present disclosure the method determines that the turbocharger shaft speed is greater than or equal to an initialization threshold the initialization threshold by applying a lookup table that multiplies actual ICE mass flow by a factor based on a filtered rate of change of the turbocharger shaft speed at a time at which the SSCA is initialized.

In another aspect of the present disclosure the method applies closed loop calculations to a calibrated turbocharger target shaft speed, outputs a desired mass flow through the compressor of the turbocharger, and converts the desired mass flow into a cylinder airmass for the boost control system of the ICE.

In another aspect of the present disclosure the method applies a throttle pressure ratio request based on the predicted turbocharger shaft speed and current rate of change of the turbocharger shaft speed, and maintains constant turbocharger shaft speed and constant flow below the upper limit, and above the lower limit.

In another aspect of the present disclosure the method selectively applies a slow learn limit, a fast learn limit, a up learn limit, and a null factor to adjustments to the turbocharger shaft speed. The slow learn limit is applied when the turbocharger shaft speed is within a first predefined threshold greater than the calibrated turbocharger target shaft speed, the fast learn limit is applied when the turbocharger shaft speed is within a second predefined threshold greater first predefined threshold and greater than the calibrated turbocharger target shaft speed, the up learn limit is applied when the turbocharger shaft speed is within a third predefined threshold less than the calibrated turbocharger target shaft speed, and the null factor is applied when the turbocharger shaft speed is substantially equal to the calibrated turbocharger target shaft speed. The slow learn limit, fast learn limit, up learn limit, and null factor are continuously applied to adjustments to the turbocharger shaft speed while the SSCA is running. The first predefined threshold is 500 revolutions per minute (RPM) above the calibrated target speed, the second predefined threshold is 1000 RPM greater than the calibrated target speed, and the up learn limit is 500 RPM less than the calibrated target speed.

In another aspect of the present disclosure the method further includes modifying the predicted turbocharger shaft speed by applying a multiplicative factor that accounts for ICE and turbocharger aging.

In another aspect of the present disclosure a system for controlling turbocharger shaft speed in an internal combustion engine (ICE) includes a boost control system having one or more sensors and one or more actuators, the one or more sensors detecting at least a turbocharger shaft speed, and a mass flow through the ICE, and the one or more actuators selectively adjusting mass flow through the ICE and the turbocharger. The system further includes one or more control modules, each of the one or more control modules having a processor, a memory, and one or more input/output (I/O) ports, the one or more control modules in communication with the one or more sensors and in communication with the one or more actuators via the I/O ports. The memory stores programmatic control logic. The processor executes the programmatic control logic. The programmatic control logic includes at least a first, a second, a third, a fourth, a fifth, and a sixth control logic. The first control logic generates a predicted turbocharger shaft speed from a sum of a measured turbocharger shaft speed and a rate of change of the turbocharger shaft speed over a predefined prediction horizon. The measured turbocharger shaft speed and rate of change of the turbocharger shaft speed are determined by one or more of: a direct measurement from a turbocharger shaft speed (TSS) sensor and a modeled turbocharger shaft rotational speed. The second control logic selectively initializes a turbocharger shaft speed control algorithm (SSCA) including:

control logic that, upon determining that the turbocharger shaft speed is greater than or equal to an initialization threshold, initializes the SSCA. The SSCA includes control logic that, upon determining that the turbocharger shaft speed is less than the initialization threshold, re-obtains the measured turbocharger shaft speed and rate of change of the turbocharger shaft speed over the predefined prediction horizon. The SSCA further includes control logic that, upon determining that the turbocharger shaft speed has fallen below the initialization threshold, exits the SSCA and re-obtains the measured turbocharger shaft speed and rate of change of the turbocharger shaft speed over the predefined prediction horizon. The initialization threshold includes a lookup table that multiplies actual ICE mass flow by a factor based on a filtered rate of change of the turbocharger shaft speed at a time at which the SSCA is initialized. The third control logic is within the SSCA, and generates a lower limit and an upper limit, greater than the lower limit, to a quantity of turbocharger flow correction to be applied via the one or more actuators. The third control logic further includes control logic for calibrating the upper limit to a maximum possible turbocharger flow based on physical characteristics of the turbocharger, and control logic for calibrating the lower limit to a target turbocharger flow correction for closed loop control while the SSCA is running. The upper limit and the lower limit are enforced upon the turbocharger through use of actuators including a throttle body of the ICE and a wastegate of the turbocharger. The fourth control logic is within the SSCA, and applies a closed loop control output to the one or more actuators to control a mass flow through a compressor of the turbocharger. The fourth control logic also applies closed loop calculations to a calibrated turbocharger target shaft speed, and outputs a desired mass flow through the compressor of the turbocharger, and converts the desired mass flow into a cylinder airmass for the boost control system of the ICE. The fourth control logic further applies a throttle pressure ratio request based on the predicted turbocharger shaft speed and current rate of change of the turbocharger shaft speed, and maintains constant turbocharger shaft speed and constant flow below the upper limit, and above the lower limit. The fifth control logic is within the SSCA, and selectively determines that the turbocharger shaft speed has exceeded a predefined threshold, and utilizes the one or more actuators to directly alter a pressure ratio of the ICE. The sixth control logic is within the SSCA, and utilizes a long-term memory learning process that utilizes data from the one or more sensors and the one or more actuators as inputs to trim turbocharger performance. The sixth control logic further includes control logic for selectively applying a slow learn limit, a fast learn limit, a up learn limit, and a null factor to adjustments to the turbocharger shaft speed. The slow learn limit is applied when the turbocharger shaft speed is within a first predefined threshold greater than the calibrated turbocharger target shaft speed, the fast learn limit is applied when the turbocharger shaft speed is within a second predefined threshold greater first predefined threshold and greater than the calibrated turbocharger target shaft speed, the up learn limit is applied when the turbocharger shaft speed is within a third predefined threshold less than the calibrated turbocharger target shaft speed, and the null factor is applied when the turbocharger shaft speed is substantially equal to the calibrated turbocharger target shaft speed. The slow learn limit, fast learn limit, up learn limit, and null factor are continuously applied to adjustments to the turbocharger shaft speed while the SSCA is running. The first predefined threshold is 500 revolutions per minute (RPM) above the calibrated target speed, the second predefined threshold is 1000 RPM greater than the calibrated target speed, and the up learn limit is 500 RPM less than the calibrated target speed. The SSCA causes the turbocharger to operate stably within predefined hardware limits at an optimum shaft speed while maintaining constant flow across a range of pressure ratios. Further, the SSCA includes control logic that modifies the predicted turbocharger shaft speed by applying a multiplicative factor that accounts for ICE and turbocharger aging.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
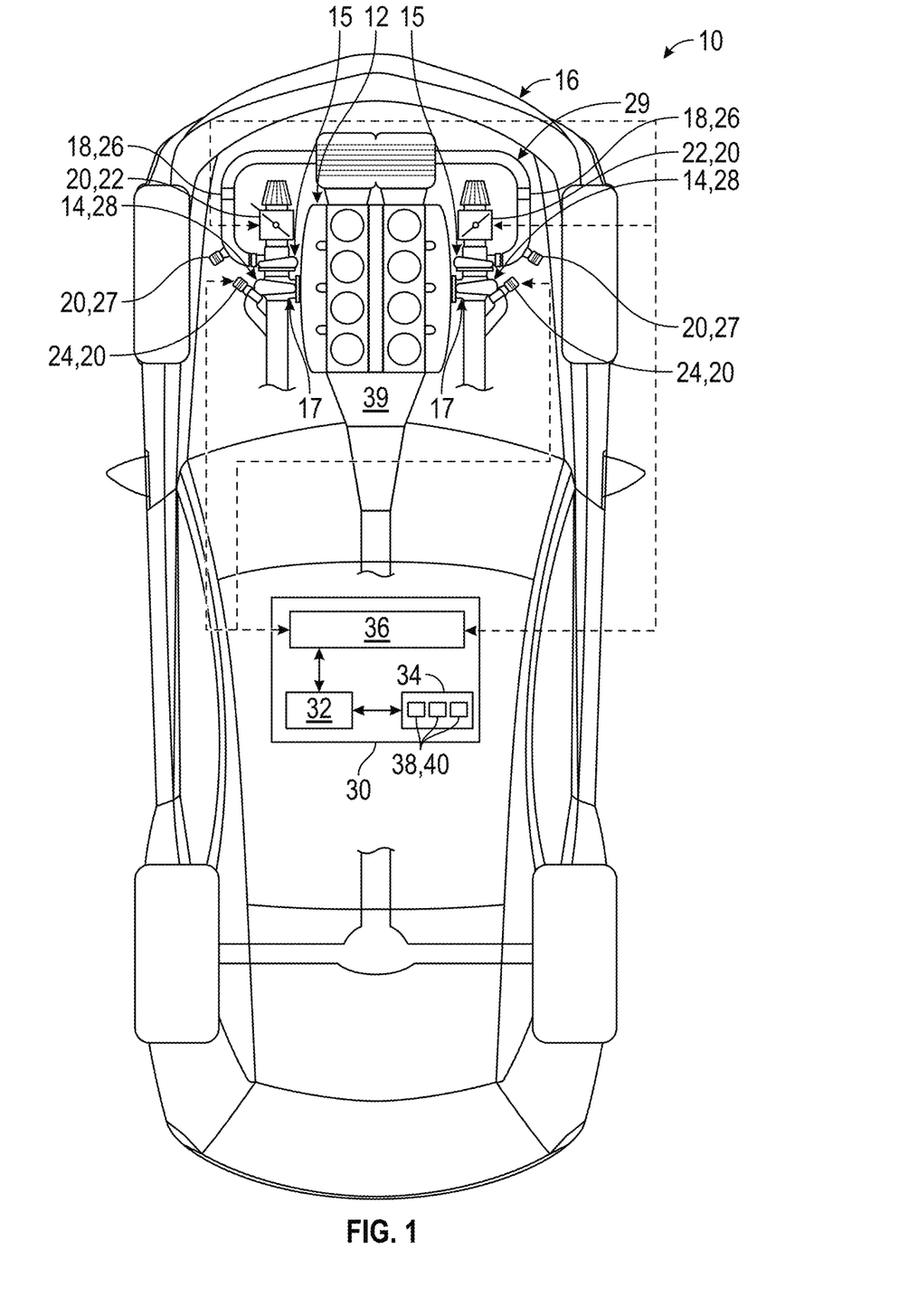
FIG. 1 is a diagram of a vehicle with a system and method for controlling internal combustion engine (ICE) turbocharger shaft speed accordingly to an aspect of the present disclosure.

Referring to FIG. 1, a system 10 for controlling an internal combustion engine (ICE) 12 having a forced induction device such as a turbocharger 14. The system 10 operates to accurately, precisely, and rapidly control turbocharger 14 shaft speed to achieve optimum ICE 12 power density under a variety of different operating conditions. The ICE 12 shown is depicted within a vehicle 16, however, it should be appreciated that the ICE 12, may be disposed within a vehicle 16, or may be a stationary ICE 12 used to power any number of other systems which are not specifically shown. Further, it should be appreciated that while the ICE 12 shown is depicted as a V8, other configurations of ICE 12 are contemplated, including but not limited to: rotary engines, radial engines, inline-engines, v-engines, horizontally-opposed engines, or any other form of ICE 12 having one or more turbochargers 14. Likewise, it should be appreciated that the ICE 12 may be a gasoline-powered ICE 12, or may combust other types of fuel including but not limited to: diesel, natural gas, propane, hydrogen, or the like without departing from the scope or intent of the present disclosure. Additionally, the vehicle 16 shown is a passenger car, it should be appreciated that the vehicle 16 may be any type of vehicle 16 utilizing an ICE 12 without departing from the scope or intent of the present disclosure. In several examples, the vehicle 16 may include a car, a truck, a sports-utility-vehicle (SUV), a semi, a tractor, a bus, a motorcycle, a scooter; an aircraft such as a plane, a helicopter; or a watercraft such as a powerboat, a hydroplane, hovercrafts, or the like.

The system 10 includes the ICE 12, which has a turbocharger 14 affixed thereto. The turbocharger 14 further includes a compressor 15 and a turbine 17. The turbine 17 is mounted to a turbocharger shaft (not specifically shown) at a first end, and the compressor 15 is mounted to the turbocharger shaft at a second end, opposite the first end. The turbine 17 is driven by exhaust gasses generated by operation of the ICE 12, and as the turbine 17 rotates, the compressor 15 is caused to rotate and draw fresh air into the turbocharger 14 where it is compressed and then fed into the ICE 12 at a pressure greater than ambient air pressure.

The ICE 12 and turbocharger 14 are equipped with a variety of sensors 18 and actuators 20 including but not limited to: a throttle body 22, a wastegate 24, an inlet air flow (IAF) sensor 26, and a turbocharger shaft speed (TSS) sensor 28. In several aspects, the ICE 12 and turbocharger 14 are equipped with a boost control system (BCS) which may be electronic (EBCS), manual (MBCS), or a combination thereof. The BCS of the ICE 12 and turbocharger 14 may include further sensors 18 and actuators 20 such as a boost control solenoid (not specifically shown) that operates one or more of the wastegate 24 and a boost pressure relief valve such as a bypass valve or blowoff valve 27 in communication with the wastegate 24. The IAF sensor 26 may be any of a variety of different sensors 18 used to detect air movement, air volume, and/or air pressure within the intake tract 29 of the ICE 12. Accordingly, the IAF sensor 26 may be one or more of a mass airflow (MAF) sensor, a manifold absolute pressure (MAP) sensor, or the like. Additionally, it should be appreciated that any quantity of IAF sensors 26 may be present in, and detect inlet air flow information within the system 10 without departing from the scope or intent of the present disclosure. In further examples, the sensors 18 and actuators 20 include torque sensors, inlet air temperature sensors, exhaust gas temperature sensors, chassis dynamics sensors, powertrain actuators, chassis dynamics actuators such as active suspension components, or the like. The sensors 18 and actuators 20 communicate with one or more control modules 30.

In several aspects, the one or more control modules 30 each define non-generalized electronic control devices having a preprogrammed digital computer or processor 32, non-transitory computer readable medium or memory 34 used to store data such as control logic, software applications, instructions, computer code, data, lookup tables, etc., and one or more input/output (I/O) ports 36. Computer readable medium or memory 34 includes any type of medium capable of being accessed by a computer, such as read-only memory (ROM), random access memory (RAM), a hard disk drive, a compact disc (CD), a digital video disc (DVD), solid-state memory, or any other type of memory. A "non-transitory" computer readable medium or memory 34 excludes wireless, optical, or other communication links that transport electrical or other signals. A non-transitory computer readable medium or memory 34 includes media where data can be permanently stored and media where data can be stored and later overwritten, such as any type of program code, including source code, object code, and executable code. The processor 32 is configured to execute the code or instructions. In some examples, the control module 30 may be a dedicated wireless or Wi-Fi controller. The I/O ports 36 are configured to communicate through wired or wireless means using Wi-Fi protocols under IEEE 802.11x, Bluetooth communications protocols, radio frequency (RF) protocols, or the like.

In several aspects, the control modules 30 include one or more applications 38. An application 38 is a software program configured to perform specific functions or sets of functions. The application 38 may include one or more computer programs, software components, sets of instructions, procedures, functions, objects, classes, instances, related data, or a portion thereof adapted for implementation in a suitable computer readable program code. The applications 38 may be stored within the memory 34 or in an additional or separate memory 34. Examples of the applications 38 include powertrain management services such as ICE 12 control services, transmission 39 control services, chassis control services, braking control services, audio or video streaming services, audio or visual processing services, and the like. In several examples, the applications 38 include a turbocharger 14 shaft speed control application (SSCA) 40. The SSCA 40 is used to manage performance characteristics of the ICE 12 and of the turbochargers 14 affixed thereto.

Figure 2:
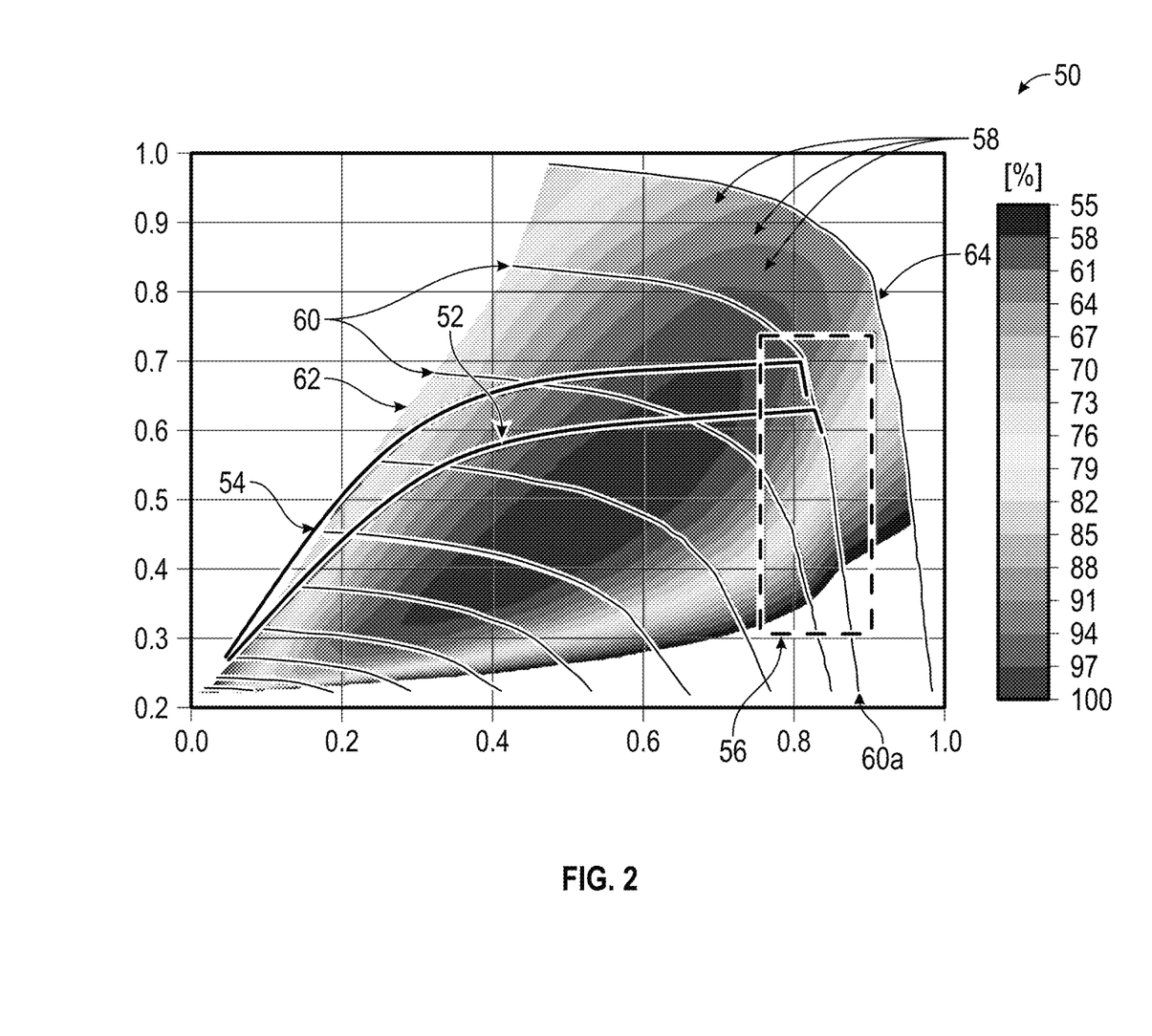
FIG. 2 is a compressor map for a turbocharger in the system of FIG. 1 for controlling ICE turbocharger shaft speed according to an aspect of the present disclosure.

Turning now to FIG. 2, and with continuing reference to FIG. 1, a turbocharger 14 compressor map 50 is shown. The compressor map 50 depicts corrected mass air flow rate of air along the X-axis and a pressure ratio across the turbocharger 14 along the Y-axis. The compressor map 50 further depicts an example of standard operating conditions 52 of the turbocharger 14, as well as plots of high temperature operating conditions 54 and a region of choked flow region 56. In several aspects, it should be appreciated that when operating in the choked flow region 56, gas-flow through the turbocharger 14 has the potential to become more unstable due to a decrease in required compressor power for a given flow and flow instabilities. The operating conditions for the choked flow region 56 vary for different compressor 15 and ICE 12 designs, but in general is depicted by the close proximity and high ramp rate of the edges of the efficiency islands 58 of the compressor map 50, and the area of the compressor map 50 where the speed lines 60 begin to converge. In the choked flow region 56, a small increase in flow yields a large increase in turbocharger 14 shaft speed and a decrease in compressor 15 efficiency. The efficiency islands 58 are depicted as differently shaded regions of the compressor map 50 and are graphical depictions of the relative ability of the turbocharger 14 to compress air without generating excessive heat. The higher the efficiency, the cooler the outlet temperature for a given turbocharger 14 boost pressure. A left-hand boundary 62 of the compressor map 50 defines a surge line that represents a maximum amount of pressure that the turbocharger 14 can produce while flowing the least possible mass of air.

By contrast, the right-hand boundary of the compressor map 50 defines an absolute choke line 64. Absolute choke is the maximum quantity of air that the compressor 15 of the turbocharger can flow at a given pressure ratio. As the turbocharger 14 operates in or close to the absolute choke line 64 or choke region 56 of the compressor map 50 compressor 15 outlet temperatures rapidly increase as does turbocharger 14 shaft speed. The rapid increase in turbocharger 14 shaft speed along the absolute choke line 64 indicates a maximum flow-limit of the turbocharger 14.

The compressor map 50 further includes a plurality of exemplary turbocharger 14 shaft speed lines 60. The shaft speed lines 60 represent a specific rotational speed of the turbocharger shaft. As the compressor map 50 shows, near the choke line 64, the turbocharger 14 shaft speed is near a maximum possible value, and the flow rate also approaches a maximum. Accordingly, for maximum turbocharger 14 output, and maximum ICE 12 power output, maintaining the turbocharger 14 shaft speed within or near the choked flow region 56 is beneficial. However, maintaining turbocharger 14 operation within the choked flow region 56 is challenging due to the potential for unstable and uneven control of turbocharger 14 shaft speed. In order to maintain turbocharger 14 operation within or proximate to the choked flow region 56 in high-performance situations, the system 10 utilizes the SSCA 40.

Figure 3A:
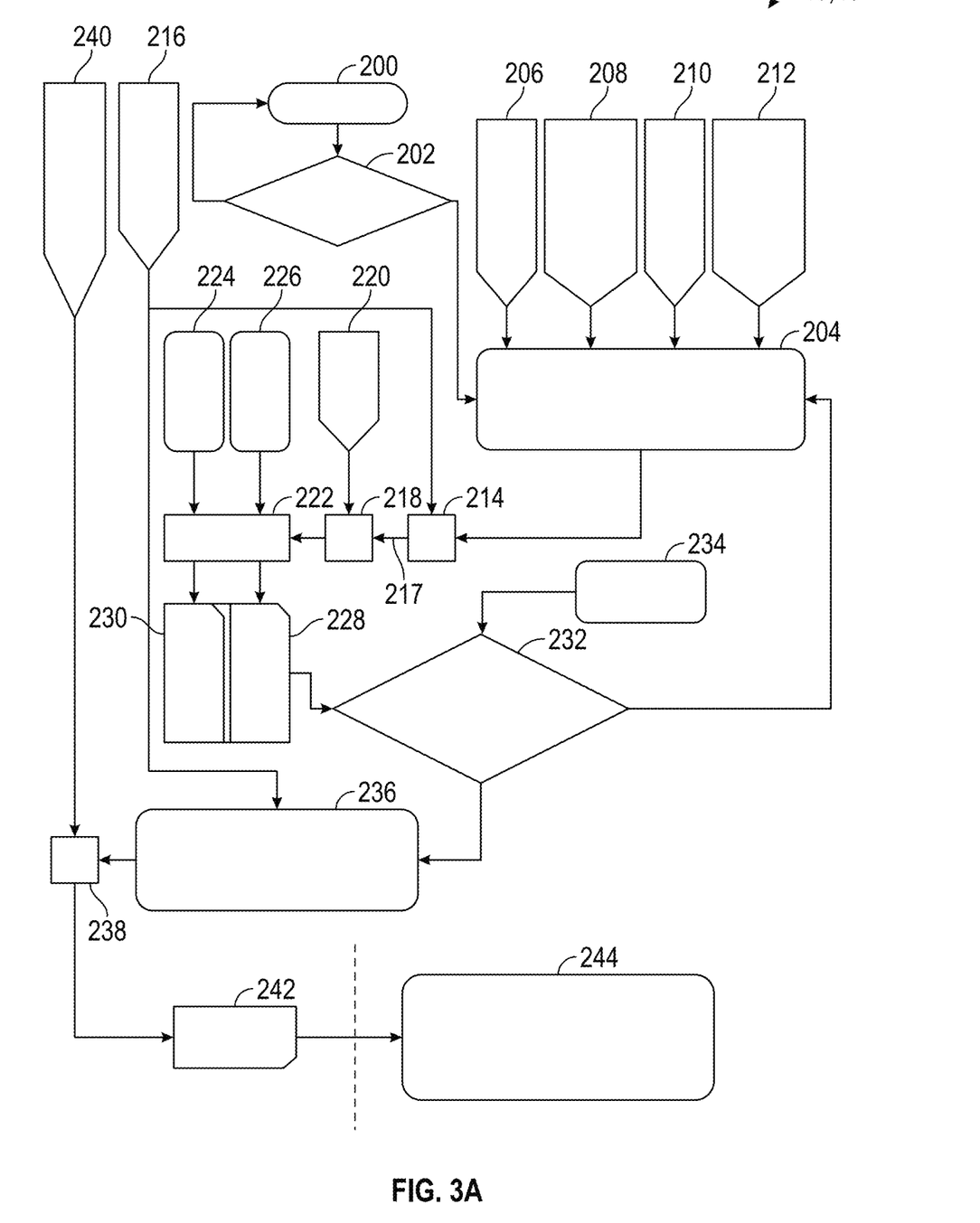
FIG. 3A is a flowchart depicting a first set of logical steps of the system and method for controlling ICE turbocharger shaft speed of FIG. 1 according to an aspect of the present disclosure.
Figure 3B:
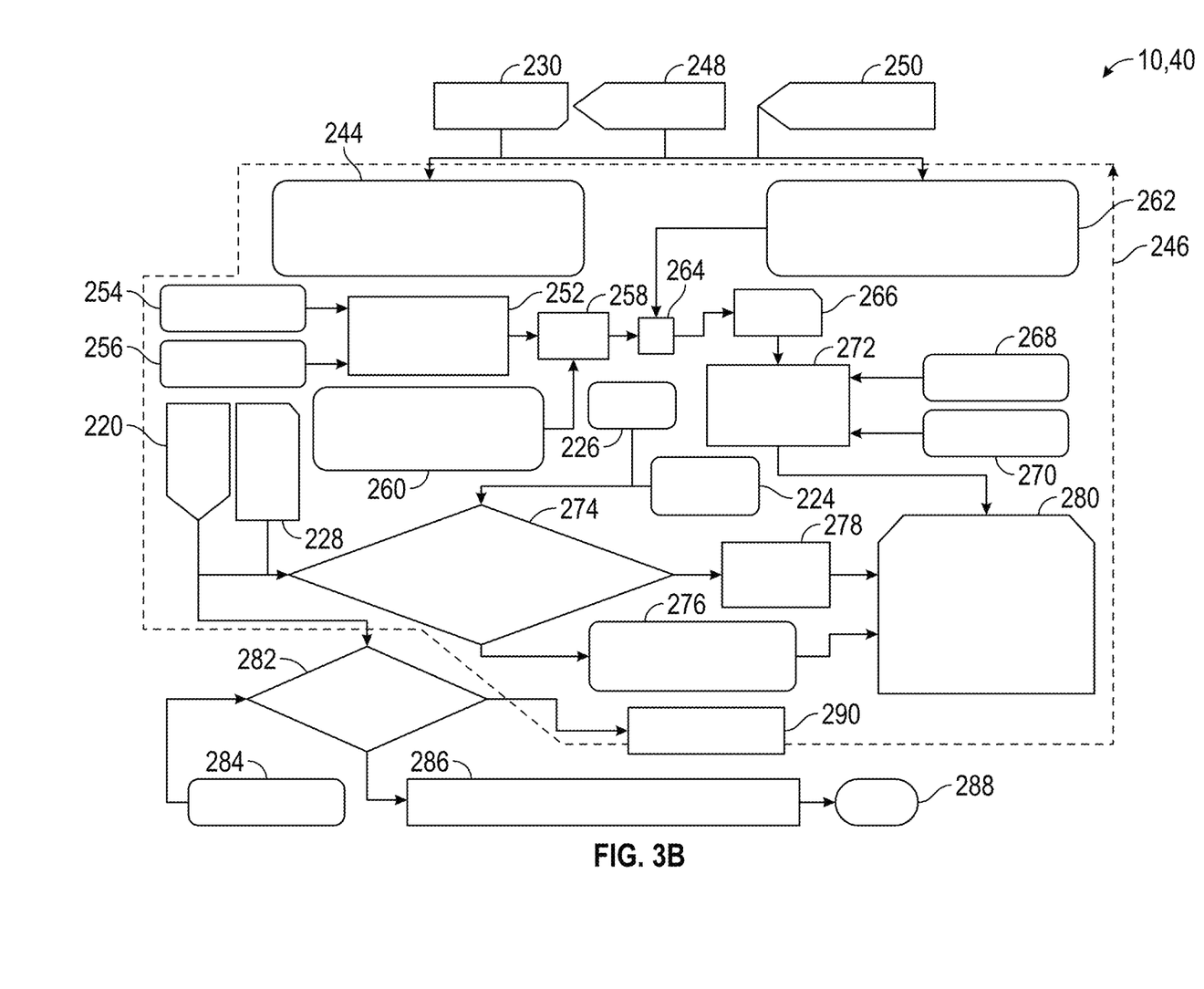
FIG. 3B is a flowchart depicting a second set of logical steps of the system and method for controlling ICE turbocharger shaft speed of FIG. 1 according to an aspect of the present disclosure.

Turning now to FIGS. 3A and 3B, the SSCA 40 is shown in further detail in flowchart form. The SSCA 40 manages rotational speed of the turbocharger 14 shaft at a maximum speed, wherein the maximum speed is defined by calibrated hardware and software limits which will be described in further detail herein. In several aspects, the SSCA 40 operates to control the turbocharger 14 shaft speed via operation of one or more of the actuators 20, under when a predefined set of initialization conditions is met, and until exit conditions are met. The SSCA 40 begins at block 200. At block 202, the SSCA 40 determines whether the ICE 12 is active and running. When the SSCA 40 determines that the ICE 12 is inactive, the SSCA 40 returns to block 200 and the cycle begins again. The SSCA 40 may run continuously, cyclically, or periodically to determine whether the ICE 12 is running.

Upon determining at block 202 that the ICE 12 is active and running, the SSCA 40 proceeds to block 204, where the SSCA 40 performs a lookup procedure to determine a prediction horizon from one or more lookup tables and/or prediction calibrations. In several aspects, the lookup tables and/or prediction calibrations include a turbine power 206, a compressor power 208, an engine speed rate of change (dn) 210, and a barometric pressure 212. In several aspects, the turbine power 206, compressor power 208, engine speed dn 210, and barometric pressure 212 are based on live data from the one or more sensors 18 and actuators 20, as well as on predefined information generated through testing procedures, or the like. In further examples, the prediction horizon is a calibrated value based on lookup tables of turbine 17 power ratio, ICE 12 speed rate of change, and barometric pressure compensation factors that account for ambient air density.

At block 214, a turbo speed rate of change (dn) 216 is obtained from the TSS sensor 28 via the I/O ports 36, and multiplied with the prediction horizon from block 204. In several aspects, the turbocharger speed dn 216 is a filtered rate of change of the turbocharger 14 shaft speed. At block 218, a turbocharger 14 shaft speed 220 is obtained from the TSS sensor 28. The prediction horizon and turbocharger speed dn 216 are combined to generate a predicted turbocharger 14 shaft speed 217. In some aspects, the turbocharger 14 shaft speed 220 is filtered to reduce erroneous data or noise in the data. It should be appreciated that the TSS sensor 28 may directly measure shaft speed data from the shaft of the turbocharger 14, or the TSS sensor 28 outputs may be modeled or interpolated from data obtained through other sensors 18 of the system 10 without departing from the scope or intent of the present disclosure. In some examples, turbocharger 14 shaft speed may be modeled from IAF sensors 26, inlet air temperature sensors, exhaust gas temperature sensors, boost pressure sensors, or the like without departing from the scope or intent of the present disclosure.

At block 222, the SSCA 40 compares a turbocharger 14 shaft speed limit calibration 224, and a target turbocharger 14 shaft speed calibration 226 to the predicted turbocharger shaft speed 217 and the turbocharger 14 shaft speed 220 data from block 218. In several aspects, the turbocharger 14 shaft speed limit and target calibrations 224, 226 are subtracted from the data from block 218. The results of the comparison are output as a turbocharger 14 speed limit differential 228, and a turbocharger 14 target speed differential 230. In several aspects, the turbocharger speed limit differential 228 is a difference between a current operating speed of the turbocharger 14 shaft, and a predefined turbocharger 14 shaft speed limit. In several aspects, the turbocharger 14 shaft speed limit is one or more of a hardware-defined limit, or a calibrated limit determined through testing and stored in memory 34. Likewise, the turbocharger target speed differential 230 is a difference between a target turbocharger 14 shaft speed for a given set of conditions and the current turbocharger 14 shaft speed as measured by the TSS sensor 28.

At block 232 a turbocharger 14 target shaft speed initialization threshold 234 is compared to the turbocharger speed limit and target speed differentials 228, 230. When the turbocharger speed limit and target speed differentials 228, 230 less than the target shaft speed initialization threshold 234, the SSCA 40 returns to block 204 where the prediction horizon calibrations are re-obtained. However, upon determining that the turbocharger speed limit and target speed differentials 228, 230 are greater than or equal to the target shaft speed initialization threshold 234, the SSCA 40 proceeds to block 236.

At block 236, the SSCA 40 looks up an initialization factor based on a calibration curve based at least in part on the turbo speed rate of change 216. In several aspects, the initialization factor calibration curve is defined by a series of experimentally-determined values that are applied as multiplicative weights to adjust the initial target airflow 242.

More specifically, the larger the turbo speed rate of change (dn) 216, the lower the initialization factor that will be pulled from the initialization factor calibration curve. Likewise, the smaller the turbo speed dn 216, the higher the initialization factor that will be pulled from the initialization factor calibration curve. In an example, the initialization factor calibration curve may be 1.0 for a turbo speed dn of 0 revolutions per minute (RPM) per second (rpm/s) or less, and 0.8 for a turbo speed dn of 2000 rpm/s. That is, when the turbo speed rate of change is less than or equal to 0 rpm/s the initial target airflow 242 will be equal to the current engine airflow 240, and when the turbo speed rate of change is 2000 rpm/s the initial target airflow 242 will be less than the current engine airflow 240.

At block 238, the initialization factor from block 236 and a current ICE 12 airflow value 240 are combined to generate an initial target flow 242 value. In several aspects, the current ICE 12 airflow value 240 may be obtained through one or more direct or indirect measurements including data obtained directly or indirectly from the IAF sensor 26 and/or calculated from boost pressure sensors, exhaust gas flow sensors, a throttle body 22 position, or the like. In several aspects, the initial target flow 242 value defines an input to a proportional integral derivative (PID) control loop 246 of the SSCA 40 that operates to manage turbocharger 14 shaft speed within the choked flow region 56 while the system 10 is in operation.

Turning now to specifically to FIG. 3B and with continuing reference to FIGS. 1-2, and 3A, the PID control loop 246 of the SSCA 40 is shown in further detail. In several aspects, the PID control loop 246 is a closed loop control that includes both proportional and integral processes that operate simultaneously, in parallel, and at least partially interdependently.

At block 244, the SSCA 40 begins the integral portion by accessing one or more integral lookup tables. The integral lookup tables are populated with data that are functions of turbocharger target speed differential 230, turbine inlet temperature 248, and compressor outlet temperature 250. At block 252, the integral values from the lookup tables are limited by application of an integral minimum calibration 254 and an integral maximum calibration 256. That is, based on the turbocharger target speed differential 230, turbine inlet temperature 248, compressor outlet temperature 250, and the initial target flow 242, at block 252 the SSCA 40 limits the integral output. The limited integral output is then sent to block 258 where the limited integral output is combined with a long-term memory 260 output.

Figure 4:
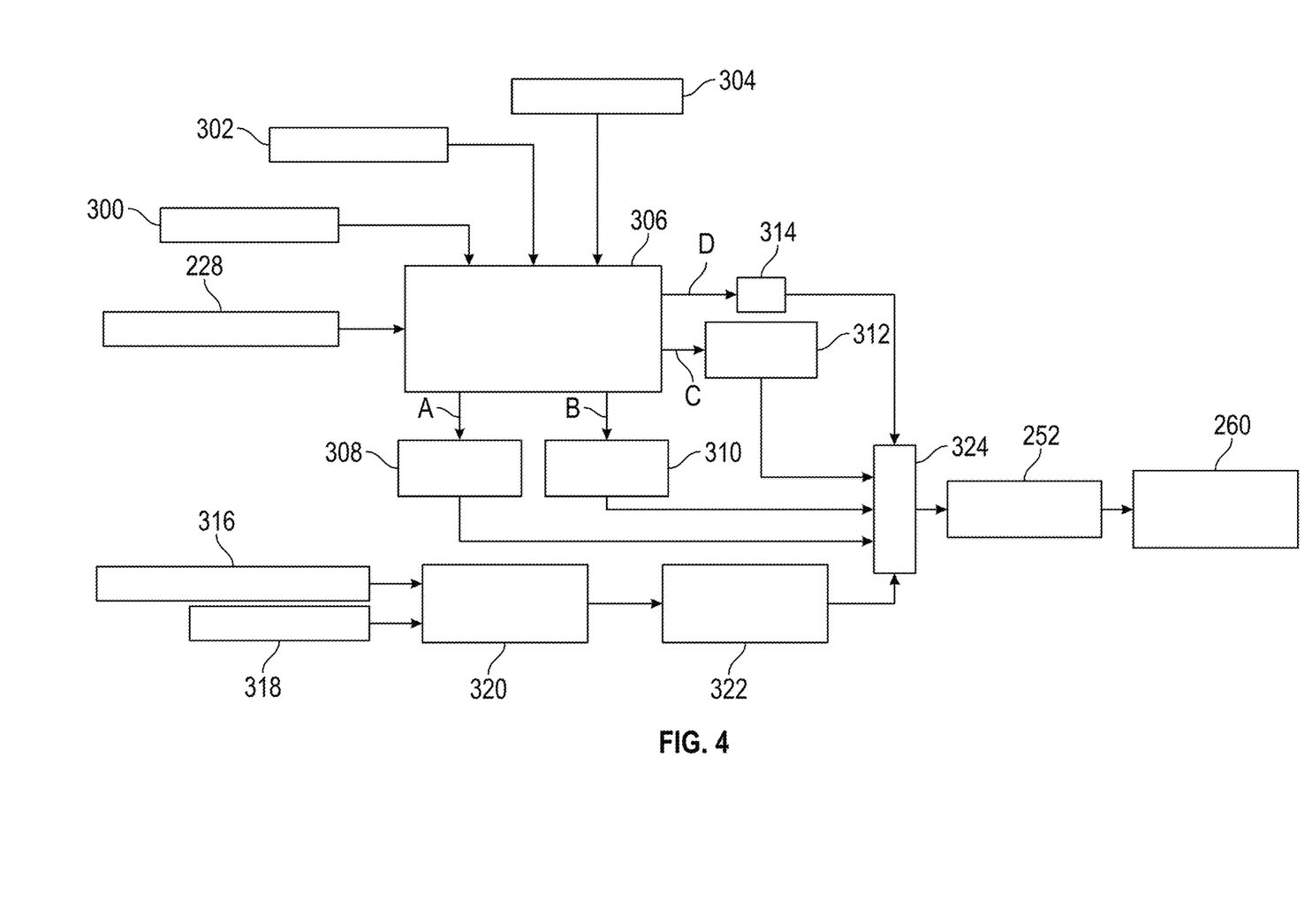
FIG. 4 is a flowchart depicting a long term memory learning process for the system and method for controlling ICE turbocharger shaft speed of FIG. 1 according to an aspect of the present disclosure.

Turning now to FIG. 4, and with continuing reference to FIGS. 1-3B, the long-term memory 260 is shown in further detail. The long-term memory 260 is generated through a learning process that may be executed continuously, periodically, recursively, and/or through a hard-coded data set by a manufacturer without departing from the scope or intent of the present disclosure. It should be appreciated that in order to ensure consistent results, the long-term memory 260 reviews current system 10 stability before actively updating any data stored therein. In several aspects, initialization criteria for the long-term memory 260 learning process include, but are in no way limited to: determining that the turbo speed dn 216 is within calibrated limits, the engine speed dn 210 is relatively stable, exhaust temperatures are below a calibrated limit such as approximately 1100° Celsius, and barometric pressure is higher than a threshold. In a particular example, the barometric pressure may be calibrated to a predefined maximum elevation with margin for weather fluctuations.

In several aspects, the long-term memory 260 includes a slow learn limit 300, a fast learn limit 302, and an up learn limit 304. Each of the slow learn, fast learn, and up learn limits 300, 302, 304 are based on differences in turbocharger 14 actual shaft speed and target shaft speed for a given set of circumstances. In an example, the slow learn limit may be based on a 500 revolution per minute (rpm) difference between the actual shaft speed and target shaft speed for the turbocharger 14. That is, the slow learn limit 300 may be applied when the actual turbocharger 14 shaft speed is approximately 500 rpm greater than the target shaft speed. Likewise, the fast learn limit may be applied when the actual turbocharger 14 shaft speed is approximately 1000 rpm greater than the target shaft speed, and the up learn limit may be applied when the actual turbocharger 14 shaft speed is 500 rpm or more less than the target shaft speed. The slow, fast, and up learn limits 300, 302, 304 are compared to the turbocharger speed limit differential 228 at block 306.

Upon determining that the actual turbocharger 14 shaft speed is within the slow learn limit 300, a slow learn calibration 308 is applied. Upon determining that the actual turbocharger 14 shaft speed is within the fast learn limit 302, a fast learn calibration 310 is applied. Upon determining that the actual turbocharger 14 shaft speed is within the up learn limit 304, an up learn calibration 312 is applied. Upon determining that none of the slow learn limit 300, fast learn limit 302, or up learn limit 304 is applicable, the SSCA 40 applies a null factor 314 to the turbocharger 14 shaft speed. In order to generate a properly calibrated long term memory 260 correction, the SSCA 40 takes a current ICE 12 speed 316 and current compressor 15 pressure ratio 318 as inputs to lookup a current long term memory value 320. At block 322, the current long term memory value 320 is translated into an output for the PID control loop 246. The data from block 322 is combined at block 324 with whichever of the slow learn calibration 308, fast learn calibration 310, up learn calibration 312, and/or null factor 314 is appropriate given the current and target turbocharger 14 shaft speeds. Minimum and maximum limits for the long-term memory 260 output are applied to the data from block 324, and the resulting values are stored within the long term memory 260 table. As noted above, the long-term memory 260 learning process may be executed continuously, periodically, and/or recursively to trim or otherwise cause the outputs of the SSCA 40 to accurately, precisely, and rapidly adjust the turbocharger 14 shaft speed to meet the target shaft speed and thereby to maintain turbocharger 14 performance and operation within the choked flow region 56. Long term learning is, in general, biased to learn down more readily, than to learn up in order to provide a margin for hardware safety. Additionally, multiple different learn rates for downward learning may be applied based at least in part on a difference between current and target turbocharger 14 shaft speed.

Referring once more to FIG. 3B, and with continuing reference to FIGS. 1-3A and 4, the SSCA 40 begins the proportional portion by accessing one or more proportional lookup tables 262. The proportional lookup tables 262 are populated with data that are functions of turbocharger target speed differential 230, turbine inlet temperature 248, and compressor outlet temperature 250. At block 264, an output of the proportional lookup tables 262 is combined with the data from block 258, and a target flow 266 is generated. The target flow 266 defines a turbocharger 14 flow rate that will, optimally, cause the turbocharger 14 to operate within the choked flow region 56 without overspeeding or otherwise approaching hardware or software limits, and maintaining thermal performance targets. A minimum flow control calibration 268 and a maximum flow control calibration 270 are applied to the target flow 266 at block 272. In several aspects, the minimum and maximum flow control calibrations 268, 270 define lower and upper limits to the amount of turbocharger 14 flow correction that may be requested for a given set of inputs. In some examples, a maximum flow calibration 270 may be approximately 500 grams/second of air, while a minimum flow calibration may be approximately 350 grams/second of air, though the minimum and maximum flow calibrations 268, 270 may vary substantially from the values discussed above depending on the particular hardware in the system 10 and the like. By applying minimum and maximum flow control calibrations 268, 270, large, erratic, and/or unwanted turbocharger 14 flow fluctuations may be avoided. In several aspects, the minimum and maximum flow calibrations 268, 270 may be enforced through use of the one or more actuators 20 of the system 10. The maximum flow calibration 270 may also be a hardware-imposed limit on the turbocharger 14, and the throttle body 22 and wastegate 24 may operate individually or in conjunction with one another to enforce the maximum flow calibration 270. Likewise, the minimum flow calibration 268 may be enforced through actuation of the throttle body 22 and wastegate 24. However, the minimum flow calibration 268 is not a hardware-imposed limit, but rather a lower limit used in closed-loop control during the PID control loop 246.

At block 274, a the SSCA 40 performs a comparison of the turbocharger 14 speed differential limit 228, the turbocharger 14 shaft speed limit calibration 224, the target turbocharger 14 shaft speed calibration 226, and the current turbocharger 14 shaft speed 220. Upon determining that the turbocharger 14 speed differential limit 228 is greater than or equal to a turbocharger 14 speed limit threshold and the current turbocharger 14 shaft speed 220 is greater than or equal to the target turbocharger 14 shaft speed calibration 226, the SSCA 40 proceeds to block 276 where a desired throttle pressure ratio lookup calibration is applied. However, upon determining that the turbocharger 14 speed differential limit 228 is less than the turbocharger 14 speed limit threshold and/or the current turbocharger 14 shaft speed 220 is less than the target turbocharger 14 shaft speed calibration 226, the SSCA 40 proceeds to block 278 where the SSCA 40 does not make a throttle request.

At block 280, a turbocharger 14 flow limit and pressure ratio demand value is forwarded to the torque control system of the ICE 12 as a limit and/or demand. That is, the SSCA 40 utilizes both the limited flow output from block 272 and the throttle request information from blocks 276 or 278 to define operating conditions to the torque control system. In several aspects, at block 280, the SSCA 40 utilizes current or predicted ICE 12 speed as an input to the torque control system request. In some examples, the torque control system request may be a direct pressure ratio request. It should be appreciated that the wastegate or multiple wastegates 24 of the ICE 12 have hardware-related rate limits. That is, the wastegates 24 may be able to move from fully closed to open, or vice-versa, in approximately one second. The one-second delay in such position affects how well the wastegates 24 can manage turbine 17 speed, and therefore turbocharger 14 shaft speed. Accordingly, in order to rapidly, accurately, and precisely adjust turbine 17 speed, turbocharger 14 shaft speed, and turbocharger 14 power, the system 10 utilizes the one or more throttle bodies 22 of the system 10 to rapidly alter flow through the ICE 12 and therefore, flow through the turbocharger 14 turbine 17. That is, throttle bodies 22 are faster-acting actuators 20 than the wastegates 24, and have the ability to move from fully closed to fully open, or vice versa, many times faster than the wastegates 24. In some examples, throttle bodies 22 may move from fully closed to fully open, or vice versa, in less than a quarter of a second. Accordingly, throttle bodies 22 provide rapid control and can rapidly alter the flow of gas through the ICE 12 and through the turbocharger 14. By throttling boost and increasing compressor 15 pressure ratio, the required compressor 15 power is rapidly increased. The ratio of needed compressor 15 power to available turbine 17 power is increased, and turbocharger 14 shaft speed is immediately slowed. Accordingly, the fast actuator 20 control via the throttle bodies 22 allows the compressor 15 to operate near the maximum speed line 60A in the choked flow region 56 with the ability to nearly instantaneously slow the turbocharger 14 shaft speed by actuation of the throttle body 22 to alter flow through the ICE 12 and turbine 17.

In several aspects, the SSCA 40 continuously obtains the turbocharger 14 shaft speed 220 from the TSS sensor 28, and compares the shaft speed 220 to an exit threshold at block 282. The exit threshold is a predefined set of values which may vary from application to application, and from turbocharger 14 to turbocharger 14, but generally should be appreciated to be values that define a low-speed boundary of the choked flow region 56. The exit speed threshold at block 282 is initialized to an exit threshold speed calibration 284 which may be permanent, or may change periodically and/or continuously. In several aspects, the exit threshold speed calibration 284 may differ from application to application, from turbocharger 14 to turbocharger 14, and/or may vary over time as ICE 12 and turbocharger 14 components age and performance of the ICE 12 and/or turbocharger 14 changes.

Accordingly, upon determining that the turbocharger 14 shaft speed 220 is below the exit threshold speed, the SSCA 40 exits and normal operation of the ICE 12 and turbocharger 14 control systems resume at block 286. More specifically, at block 286, a flow limit is set to a predetermined maximum value defined in software, and throttle requests are released. At block 288, the SSCA 40 ends.

However, upon determining that the turbocharger 14 shaft speed 220 is greater than or equal to the exit threshold speed, the SSCA 40 proceeds to block 290 and the PID control loop 246 runs continuously, iteratively, recursively, or the like until the turbocharger 14 shaft speed 220 is found to be below the exit threshold speed at block 282, at which point the SSCA 40 proceeds to blocks 286, and 288 as described above.

A system and method for controlling ICE 12 turbocharger 14 shaft speed of the present disclosure offers several advantages. These include the ability to very precisely, quickly, and accurately control and/or limit ICE 12 torque and power at a given turbocharger 14 speed target by increasing compressor 15 and/or ICE 12 flow to meet targets as needed while using preexisting componentry and reducing complexity. Additionally, the system 10 and method of the present disclosure provide for the ability to control ICE 12 turbocharger 14 shaft speed within the choked flow region 56 to optimize turbocharger 14 and ICE 12 output with robust and redundant control by utilizing multiple separate control functionalities working in conjunction to limit airflow through the ICE 12 and physically increasing the pressure ratio across the compressor 15 which increases compressor 15 power.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for controlling turbocharger shaft speed for an internal combustion engine (ICE), the system comprising:
a boost control system having one or more sensors and one or more actuators, the one or more sensors detecting at least a turbocharger shaft speed, and a mass flow through the ICE, and the one or more actuators selectively adjusting mass flow through the ICE and the turbocharger;
one or more control modules, each of the one or more control modules having a processor, a memory, and one or more input/output (I/O) ports, the one or more control modules in communication with the one or more sensors and in communication with the one or more actuators via the I/O ports, the memory storing programmatic control logic, the processor executing the programmatic control logic, the programmatic control logic comprising:
a first control logic for generating a predicted turbocharger shaft speed from data acquired by a turbocharger shaft speed (TSS) sensor of the one or more sensors; including:
control logic for generating a predicted turbocharger shaft speed from a sum of a measured turbocharger shaft speed, and a rate of change of the turbocharger shaft speed over a predefined prediction horizon,
wherein the measured turbocharger shaft speed is determined by one or more of: a direct measurement from the TSS sensor and a modeled turbocharger shaft rotational speed; and
control logic that modifies the predicted turbocharger shaft speed by applying a multiplicative factor that accounts for ICE and turbocharger aging;
a second control logic for selectively initializing a turbocharger shaft speed control algorithm (SSCA);
a third control logic within the SSCA for generating a lower limit and an upper limit, greater than the lower limit, to a quantity of turbocharger flow correction to be applied via the one or more actuators;
a fourth control logic within the SSCA for applying a closed loop control output to the one or more actuators to control a mass flow through a compressor of the turbocharger;
a fifth control logic within the SSCA that selectively determines that the turbocharger shaft speed has exceeded a predefined threshold, and utilizes the one or more actuators to directly alter a pressure ratio of the ICE; and
a sixth control logic within the SSCA for utilizing a long-term memory learning process that utilizes data from the one or more sensors and the one or more actuators as inputs to trim turbocharger performance,
wherein the SSCA causes the turbocharger to operate stably within predefined hardware limits at an optimum shaft speed while maintaining constant flow across a range of pressure ratios.

2. The system of claim 1, wherein the second control logic further comprises:
control logic that, upon determining that the turbocharger shaft speed is greater than or equal to an initialization threshold, initializes the SSCA;
control logic that, upon determining that the turbocharger shaft speed is less than the initialization threshold, re-obtains the measured turbocharger shaft speed and rate of change of the turbocharger shaft speed over the predefined prediction horizon; and
control logic that, upon determining that the turbocharger shaft speed has fallen below the initialization threshold, exits the SSCA and re-obtains the measured turbocharger shaft speed and rate of change of the turbocharger shaft speed over the predefined prediction horizon.

3. The system of claim 2 wherein the initialization threshold further comprises:
a lookup table that multiplies actual ICE mass flow by a factor based on a filtered rate of change of the turbocharger shaft speed at a time at which the SSCA is initialized.

4. The system of claim 2 wherein the fourth control logic further comprises:
a control logic for applying closed loop calculations to a calibrated turbocharger target shaft speed, and outputs a desired mass flow through the compressor of the turbocharger, and converts the desired mass flow into a cylinder airmass for the boost control system of the ICE.

5. The system of claim 2 wherein the fourth control logic further comprises:
control logic that applies a throttle pressure ratio request based on the predicted turbocharger shaft speed and current rate of change of the turbocharger shaft speed; and
control logic that maintains constant turbocharger shaft speed and constant flow below the upper limit, and above the lower limit.

6. The system of claim 5, wherein the sixth control logic further comprises:
control logic for selectively applying a slow learn limit, a fast learn limit, an up learn limit, and a null factor to adjustments to the turbocharger shaft speed,
wherein the slow learn limit is applied when the turbocharger shaft speed is within a first predefined threshold greater than a calibrated turbocharger target shaft speed, the fast learn limit is applied when the turbocharger shaft speed is within a second predefined threshold greater first predefined threshold and greater than the calibrated turbocharger target shaft speed, the up learn limit is applied when the turbocharger shaft speed is within a third predefined threshold less than the calibrated turbocharger target shaft speed, and the null factor is applied when the turbocharger shaft speed is substantially equal to the calibrated turbocharger target shaft speed; and
wherein the slow learn limit, fast learn limit, up learn limit, and null factor are continuously applied to adjustments to the turbocharger shaft speed while the SSCA is running.

7. The system of claim 6 wherein the first predefined threshold is 500 revolutions per minute (RPM) above the calibrated target speed, the second predefined threshold is 1000 RPM greater than the calibrated target speed, and the up learn limit is 500 RPM less than the calibrated target speed.

8. The system of claim 1, wherein the third control logic further comprises:
a control logic for calibrating the upper limit to a maximum possible turbocharger flow based on physical characteristics of the turbocharger; and a control logic for calibrating the lower limit to a target turbocharger flow correction for closed loop control while the SSCA is running; and wherein the upper limit and the lower limit are enforced upon the turbocharger through use of actuators including a throttle body of the ICE and a wastegate of the turbocharger.

9. A method for controlling turbocharger shaft speed for an internal combustion engine (ICE), the method comprising:

detecting at least a turbocharger shaft speed and a mass flow through the ICE with one or more sensors disposed on the ICE and on the turbocharger;

selectively adjusting a mass flow through the ICE and the turbocharger with one or more actuators, the one or more actuators and the one or more sensors defining components of a boost control system;

utilizing one or more control modules, each of the one or more control modules having a processor, a memory, and one or more input/output (I/O) ports, the one or more control modules in communication with the one or more sensors and in communication with the one or more actuators via the I/O ports, the memory storing programmatic control logic, the processor executing the programmatic control logic the programmatic control logic comprising control logic for:

generating a predicted turbocharger shaft speed from data acquired by a turbocharger shaft speed (TSS) sensor of the one or more sensors;

selectively initializing a turbocharger shaft speed control algorithm (SSCA);

generating a lower limit and an upper limit, greater than the lower limit, to a quantity of turbocharger flow correction to be applied via the one or more actuators;

generating a predicted turbocharger shaft speed from a sum of a measured turbocharger shaft speed, and a rate of change of the turbocharger shaft speed over a predefined prediction horizon, wherein the measured turbocharger shaft speed is determined by one or more of: a direct measurement from the TSS sensor and a modeled turbocharger shaft rotational speed;

applying a closed loop control output to the one or more actuators to control a mass flow through a compressor of the turbocharger;

selectively determining that the turbocharger shaft speed has exceeded a predefined threshold, and utilizing the one or more actuators to directly alter a pressure ratio of the ICE;

initializing the SSCA upon determining that the turbocharger shaft speed is greater than or equal to an initialization threshold;

utilizing a long term memory learning process to trim turbocharger performance that uses data from the one or more sensors and the one or more actuators as inputs to trim turbocharger performance;

re-obtaining the measured turbocharger shaft speed and rate of change of the turbocharger shaft speed over the predefined prediction horizon upon determining that the turbocharger shaft speed is less than the initialization threshold; and exiting the SSCA and re-obtaining the measured turbocharger shaft speed and rate of change of the turbocharger shaft speed over the predefined prediction horizon upon determining that the turbocharger shaft speed has fallen below the initialization threshold;

applying a throttle pressure ratio request based on the predicted turbocharger shaft speed and current rate of change of the turbocharger shaft speed; and maintaining constant turbocharger shaft speed and constant flow below the upper limit, and above the lower limit; and causing the turbocharger to operate stably within predefined hardware limits at an optimum shaft speed while maintaining constant flow across a range of pressure ratios.

10. The method of claim 9 wherein determining that the turbocharger shaft speed is greater than or equal to an initialization threshold the initialization threshold further comprises:

applying a lookup table that multiplies actual ICE mass flow by a factor based on a filtered rate of change of the turbocharger shaft speed at a time at which the SSCA is initialized.

11. The method of claim 9 further comprising:

applying closed loop calculations to a calibrated turbocharger target shaft speed;

outputting a desired mass flow through the compressor of the turbocharger; and converting the desired mass flow into a cylinder airmass for the boost control system of the ICE.

12. The method of claim 11 further comprising:

selectively applying a slow learn limit, a fast learn limit, an up learn limit, and a null factor to adjustments to the turbocharger shaft speed, wherein the slow learn limit is applied when the turbocharger shaft speed is within a first predefined threshold greater than the calibrated turbocharger target shaft speed, the fast learn limit is applied when the turbocharger shaft speed is within a second predefined threshold greater first predefined threshold and greater than the calibrated turbocharger target shaft speed, the up learn limit is applied when the turbocharger shaft speed is within a third predefined threshold less than the calibrated turbocharger target shaft speed, and the null factor is applied when the turbocharger shaft speed is substantially equal to the calibrated turbocharger target shaft speed; and wherein the slow learn limit, fast learn limit, up learn limit, and null factor are continuously applied to adjustments to the turbocharger shaft speed while the SSCA is running, and wherein the first predefined threshold is 500 revolutions per minute (RPM) above the calibrated target speed, the second predefined threshold is 1000 RPM greater than the calibrated target speed, and the up learn limit is 500 RPM less than the calibrated target speed.

13. The method of claim 9 further comprising:

calibrating the upper limit to a maximum possible turbocharger flow based on physical characteristics of the turbocharger; and calibrating the lower limit to a target turbocharger flow correction for closed loop control while the SSCA is running; and enforcing the upper limit and the lower limit upon the turbocharger through use of actuators including a throttle body of the ICE and a wastegate of the turbocharger.

14. The method of claim 9 further comprising:

modifying the predicted turbocharger shaft speed by applying a multiplicative factor that accounts for ICE and turbocharger aging.

15. A system for controlling turbocharger shaft speed in an internal combustion engine (ICE), the system comprising:
- a boost control system having one or more sensors and one or more actuators, the one or more sensors detecting at least a turbocharger shaft speed, and a mass flow through the ICE, and the one or more actuators selectively adjusting mass flow through the ICE and the turbocharger;
- one or more control modules, each of the one or more control modules having a processor, a memory, and one or more input/output (I/O) ports, the one or more control modules in communication with the one or more sensors and in communication with the one or more actuators via the I/O ports, the memory storing programmatic control logic, the processor executing the programmatic control logic, the programmatic control logic comprising:
  - a first control logic for generating a predicted turbocharger shaft speed from a sum of a measured turbocharger shaft speed and a rate of change of the turbocharger shaft speed over a predefined prediction horizon, wherein the measured turbocharger shaft speed and rate of change of the turbocharger shaft speed are determined by one or more of: a direct measurement from a turbocharger shaft speed (TSS) sensor and a modeled turbocharger shaft rotational speed;
  - a second control logic for selectively initializing a turbocharger shaft speed control algorithm (SSCA), including:
    - control logic that, upon determining that the turbocharger shaft speed is greater than or equal to an initialization threshold, initializes the SSCA;
    - control logic that, upon determining that the turbocharger shaft speed is less than the initialization threshold, re-obtains the measured turbocharger shaft speed and rate of change of the turbocharger shaft speed over the predefined prediction horizon; and
    - control logic that, upon determining that the turbocharger shaft speed has fallen below the initialization threshold, exits the SSCA and re-obtains the measured turbocharger shaft speed and rate of change of the turbocharger shaft speed over the predefined prediction horizon, wherein the initialization threshold includes a lookup table that multiplies actual ICE mass flow by a factor based on a filtered rate of change of the turbocharger shaft speed at a time at which the SSCA is initialized;
  - a third control logic within the SSCA for generating a lower limit and an upper limit, greater than the lower limit, to a quantity of turbocharger flow correction to be applied via the one or more actuators; including:
    - control logic for calibrating the upper limit to a maximum possible turbocharger flow based on physical characteristics of the turbocharger; and
    - control logic for calibrating the lower limit to a target turbocharger flow correction for closed loop control while the SSCA is running; and
    - wherein the upper limit and the lower limit are enforced upon the turbocharger through use of actuators including a throttle body of the ICE and a wastegate of the turbocharger;
  - a fourth control logic within the SSCA for applying a closed loop control output to the one or more actuators to control a mass flow through a compressor of the turbocharger, including:
    - control logic for applying closed loop calculations to a calibrated turbocharger target shaft speed, and outputs a desired mass flow through the compressor of the turbocharger, and converts the desired mass flow into a cylinder airmass for the boost control system of the ICE;
    - control logic that applies a throttle pressure ratio request based on the predicted turbocharger shaft speed and current rate of change of the turbocharger shaft speed; and
    - control logic that maintains constant turbocharger shaft speed and constant flow below the upper limit, and above the lower limit;
  - a fifth control logic within the SSCA that selectively determines that the turbocharger shaft speed has exceeded a predefined threshold, and utilizes the one or more actuators to directly alter a pressure ratio of the ICE; and
  - a sixth control logic within the SSCA for utilizing a long-term memory learning process that utilizes data from the one or more sensors and the one or more actuators as inputs to trim turbocharger performance, including:
    - control logic for selectively applying a slow learn limit, a fast learn limit, an up learn limit, and a null factor to adjustments to the turbocharger shaft speed,
    - wherein the slow learn limit is applied when the turbocharger shaft speed is within a first predefined threshold greater than the calibrated turbocharger target shaft speed, the fast learn limit is applied when the turbocharger shaft speed is within a second predefined threshold greater first predefined threshold and greater than the calibrated turbocharger target shaft speed, the up learn limit is applied when the turbocharger shaft speed is within a third predefined threshold less than the calibrated turbocharger target shaft speed, and the null factor is applied when the turbocharger shaft speed is substantially equal to the calibrated turbocharger target shaft speed;
    - wherein the slow learn limit, fast learn limit, up learn limit, and null factor are continuously applied to adjustments to the turbocharger shaft speed while the SSCA is running, wherein the first predefined threshold is 500 revolutions per minute (RPM) above the calibrated target speed, the second predefined threshold is 1000 RPM greater than the calibrated target speed, and the up learn limit is 500 RPM less than the calibrated target speed; and
    - wherein the SSCA causes the turbocharger to operate stably within predefined hardware limits at an optimum shaft speed while maintaining constant flow across a range of pressure ratios, and wherein the SSCA modifies the predicted turbocharger shaft speed by applying a multiplicative factor that accounts for ICE and turbocharger aging.

* * * * *